United States Patent
Naik

(10) Patent No.: US 10,664,759 B2
(45) Date of Patent: May 26, 2020

(54) DYNAMIC BUSINESS RULE CREATION USING SCORED SENTIMENTS

(71) Applicant: FAIR ISAAC CORPORATION, San Jose, CA (US)

(72) Inventor: Amit Naik, Sunnyvale, CA (US)

(73) Assignee: FAIR ISAAC CORPORATION, San Jose, CA (US)

( * ) Notice: Subject to any disclaimer, the term of this patent is extended or adjusted under 35 U.S.C. 154(b) by 973 days.

(21) Appl. No.: 14/522,304

(22) Filed: Oct. 23, 2014

(65) Prior Publication Data

US 2016/0117591 A1    Apr. 28, 2016

(51) Int. Cl.

| G06F 17/00 | (2019.01) |
|---|---|
| G06N 5/00 | (2006.01) |
| G06N 5/02 | (2006.01) |
| G06F 7/24 | (2006.01) |
| G06Q 30/02 | (2012.01) |
| G06F 40/30 | (2020.01) |
| G06F 40/242 | (2020.01) |

(52) U.S. Cl.
CPC .............. *G06N 5/025* (2013.01); *G06F 7/24* (2013.01); *G06F 40/242* (2020.01); *G06F 40/30* (2020.01); *G06Q 30/02* (2013.01)

(58) Field of Classification Search
None
See application file for complete search history.

(56) References Cited

U.S. PATENT DOCUMENTS

| 2008/0250452 A1* | 10/2008 | Iwamoto | ................ H04H 20/93 |
| | | | 725/39 |
| 2013/0091117 A1* | 4/2013 | Minh | ................ G06F 17/30707 |
| | | | 707/709 |
| 2013/0103385 A1* | 4/2013 | Ghosh | ................. G06F 17/2785 |
| | | | 704/9 |
| 2014/0164502 A1* | 6/2014 | Khodorenko | ......... H04L 67/325 |
| | | | 709/204 |
| 2015/0227528 A1* | 8/2015 | Kang | ..................... G06F 17/27 |
| | | | 707/750 |

* cited by examiner

*Primary Examiner* — Luis A Sitiriche

(74) *Attorney, Agent, or Firm* — Mintz, Levin, Cohn, Ferris, Glovsky and Popeo, P.C.; Michael Van Loy; Paul Brockland

(57) ABSTRACT

A method for analyzing and implementing sentiments includes sorting data from the data stream into sorted data by using a corpus builder. The sorted data is then input into an opinion mining platform where selected content is obtained based on the identification of keywords present in the sorted data. A sentiment extraction program generates sentiment metrics based on analysis of the selected content. A rules extractor program determines, based on the sentiment metrics satisfying rules, if actions are to be performed by a business rules engine.

22 Claims, 4 Drawing Sheets

DYNAMIC BUSINESS RULE CREATION USING SCORED SENTIMENTS

TECHNICAL FIELD

The present disclosure relates generally to analyzing of sentiments mined from data contained in a data stream. The analysis can be performed by natural-language programs to determine the sentiment embedded within the data and provide it with a label or score. The scored (or labelled) sentiments can be then input into a set of conditionals to determine if an action is required.

BACKGROUND

Users of products and services express their sentiments, opinions, and concerns in varying forms and across varying media outlets. They can use web-based services such as blogs, TWITTER feeds, personal webpages, or email lists to inform others of their sentiments. Also, specific venues can be used for the expressing of sentiments, providing ratings, or giving reviews, e.g. YELP, EPINIONS, etc. However, the aggregate of all of the aforementioned sources results in the sentiments being embedded in a large and unorganized body of data, necessitating filtering, parsing, mining, or other data reduction techniques.

SUMMARY

In one aspect, sentiment analysis of a data stream is performed by first sorting data from the data stream into sorted data by using a corpus builder. The sorted data is then input into an opinion mining platform where selected content is obtained based on the identification of keywords present in the sorted data. A sentiment extraction program generates sentiment metrics based on analysis of the selected content. A rules extractor program determines, based on the sentiment metrics satisfying rules, if actions are to be performed by a business rules engine.

In some variations one or more of the following features can optionally be included in any feasible combination.

The generating of the sentiment metrics can further include generating the selected content by cleaning input from the sorted data, selecting features from the selected content, identifying a sentiment describing the features of the clean data, scoring and/or classifying the sentiment to determine the sentiment metrics, and transmitting the sentiment metrics to the rules extractor program.

Based on the rules extractor program determining that the plurality of conditions are not satisfied, the opinion mining platform can continue to obtain the selected content from the sorted data based on identifying of keywords being present in the sorted data.

Based on the rules extractor program determining that the plurality of conditions are satisfied, the opinion mining platform continues to obtain the selected content from the sorted data based on identifying of keywords being present in the sorted data.

The sentiment extraction program can use natural-language processing to generate the sentiment metrics, where the sentiment metrics can be numerical values and/or descriptive values.

The actions, or a portion of the actions, can be performed by the business rules engine. The business rules engine can be fully automated and not require human intervention for execution of the actions, or the business rules engine can be partially automated and requires some human intervention for execution of the action.

BRIEF DESCRIPTION OF THE DRAWINGS

Features, aspects, and embodiments are described in conjunction with the attached drawings, in which.

DETAILED DESCRIPTION

Figure 1:
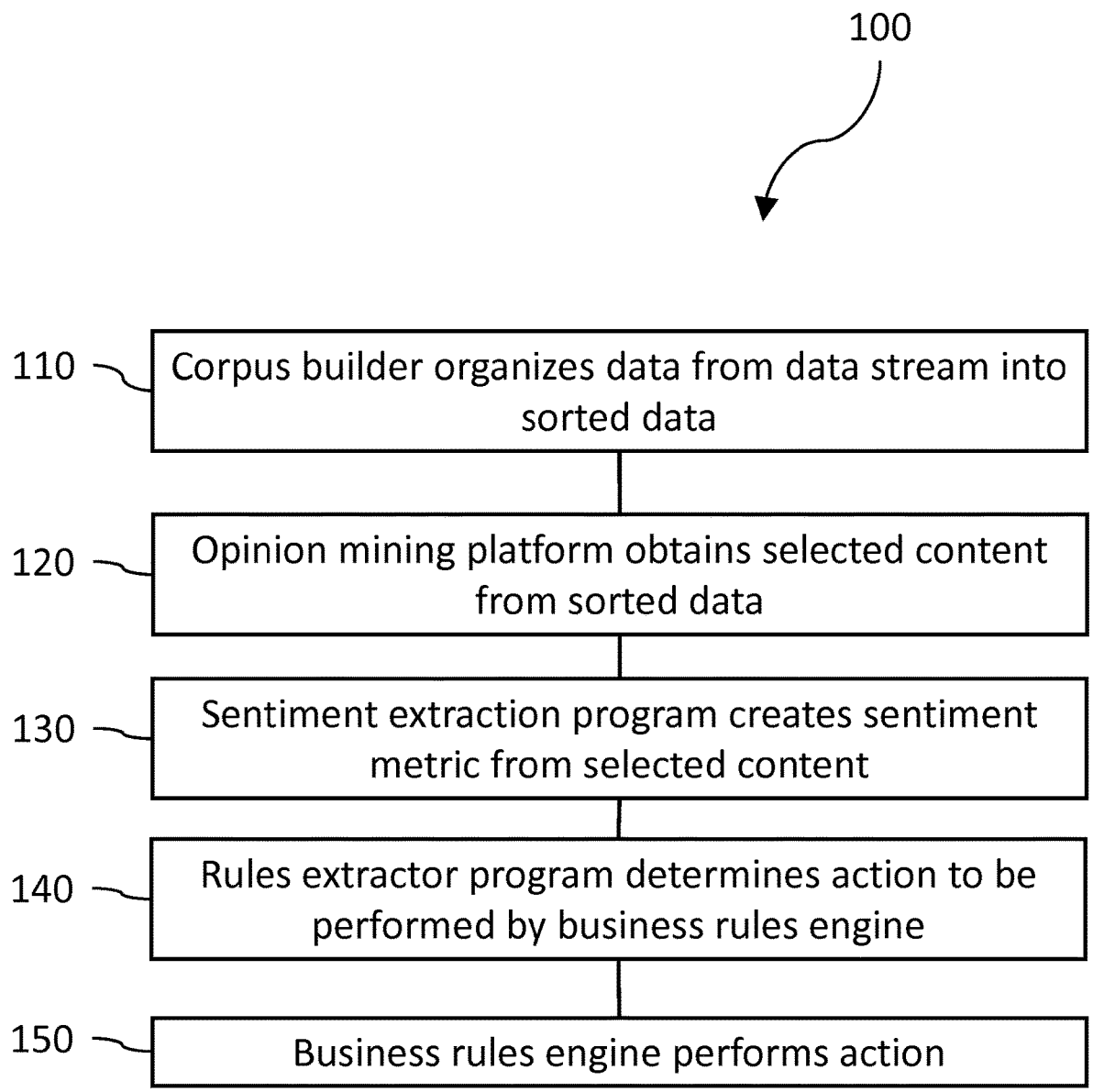
FIG. 1 is a process flow diagram illustrating sentiment analysis.

FIG. 1 is a process flow diagram 100 illustrating sentiment analysis. The current subject matter describes extraction of sentiments (or opinions) of a user, groups of users, or any body of sentiment generators, e.g. internet users as a whole, critics, reviewers, etc., as it relates to a product and/or service, and using the determined sentiment to guide business decisions. For example, if a product is generating negative sentiments, a company can issue rebates or troubleshoot the product. In another example, if a service is generating positive sentiments, then the company offering the service can offer coupons targeting a competitor, to take advantage of the successful product.

With reference again to diagram 100 of FIG. 1, at 110, a corpus builder can organize data from a data stream into sorted data, e.g. isolating TWITTER feeds, blog updates, webpage content, etc. At 120, an opinion mining platform can obtain selected content from the sorted data. This can involve searching the sorted content stream for a keyword. The keywords can be tied to a particular sentiment, e.g. "good", "bad", "cool", "defective," etc. regarding a product associated with the data stream. At 130, a sentiment extraction program can create a sentiment metric from the selected content. The sentiment metric can quantify the sentiment culled from the selected content according to the algorithms present in the sentiment extraction program. At 140, a rules extractor program can determine an action to be performed by a business rule engine. For example, the rules extractor program can have a condition whereupon if a particular threshold is reached by the sentiment metric, then the action of a coupon offering is to be made. At 150, the business rules engine can perform the action, either directly or by sending instructions to another system to perform the action.

Figure 2:
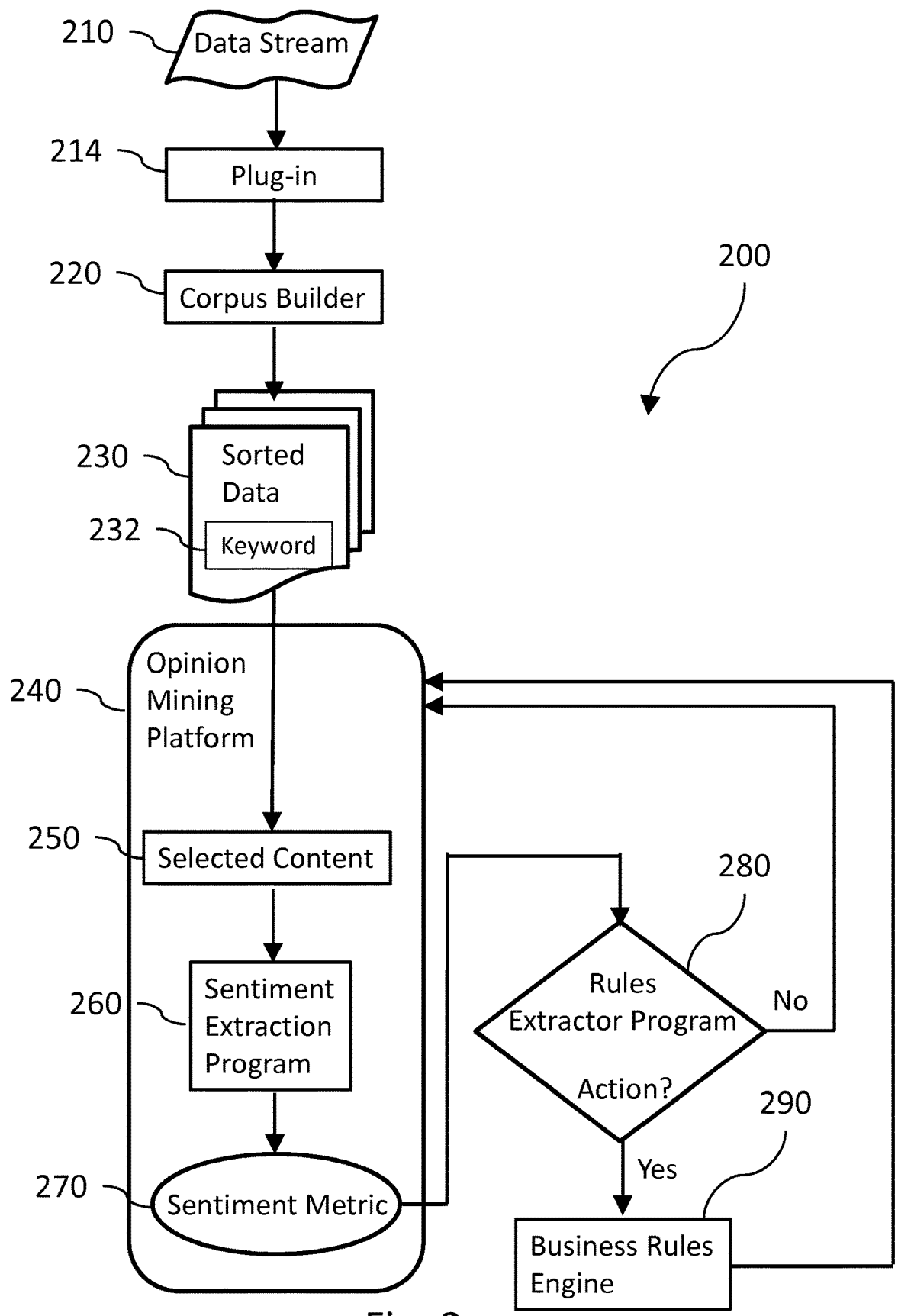
FIG. 2 is a process flow diagram illustrating sentiment analysis and action execution.

FIG. 2 is a process flow diagram 200 illustrating sentiment analysis and action execution. In one implementation, the process of analyzing sentiments for the purpose of executing an action based on the sentiments can begin with a data stream 210. The data stream 210 can be any form of data, e.g. web searches, TWITTER feeds, blog updates, live or cached audio or video streams, etc. that can contain information about user sentiments.

Before data from the data stream 210 is transmitted to the corpus builder 220, there can be a plug-in 214 which intercepts and operates on the data from the data stream 210. The plug-in 214 can be platform specific plug-ins, mechanisms, applications, packages, etc. that interpret the specific domain of a given platform and extract or transform it into a usable corpus to be collected by the corpus builder 220. The plug-in 214 can also provide relevant metadata to the subset of the data stream 210 data, e.g. user identifiers (name, username, ID numbers, etc.), date or timestamps, or locations (URL, physical, etc.) etc.

For example, a TWITTER plug-in can interpret a "tweet" as the unit of granularity of the TWITTER platform and so would correspondingly feed the corpus builder 220 a stream of tweets that can then be collated and stored, in addition to the other information described above. However, given that a single user can "re-tweet" any other users tweet, the TWITTER plug-in can be aware of the difference and attribute it correctly.

For YELP, a single "review" is the unit of granularity but a review has two components—the star rating and the text associated with the review. However the owner of the business has the ability to respond to every single review— so now the YELP plug-in can know that there are two distinct entities for any YELP page—a stream of zero or more customer reviews with text and star ratings for a given business and a stream of zero or more responses to those reviews by the business owner. The corpus builder 220 can elect to store only the text of the user reviews as supplied by the YELP plug-in, both text and star rating, or alternatively can use text, star rating and the business response to build a complete profile of each review.

The corpus builder 220 can be a program or module, executed on a computer, which intercepts the data stream 210 after being pre-filtered by the plug-in 214. The corpus builder 220 can collate any form of data, e.g. text, audio, video, etc., into categories suitable for analysis e.g. product reviews, opinion blogs, social media feeds, etc. In one implementation, the corpus builder 220 can be active, where the corpus builder 220 can be triggered by another program or a user to intercept the data stream 210. In one implantation, the corpus builder 220 can be passive, where the corpus builder 220 can be fed a constant stream of information from the data stream 210.

The output of the corpus builder 220 can be the sorted data 230. The sorted data 230 can be collections of any data from the data stream 210 that has been organized, collated, filtered, ordered, etc. by the corpus builder 220. For example, the sorted data 230 can be organized according to data origin, type of user, type of product, type of data, etc. Specific examples of sorted data 230 can be TWITTER feeds, blog postings, comment box feedback, reviews, etc. The sorted data 230 then comprises as a subset of the data stream 210 and provides a more tractable body of data for further analysis. The sorted data 230 (or data stream 210) can be actively attained, i.e. mined from publicly available sources, or passively obtained, i.e. subscription to a specific data source or other transmission by a third part to the corpus builder 220.

Keywords 232 that signify potential sentiments can be embedded in the sorted data 230. The keyword 232, as defined herein, can be any word, phrase, utterance, image, etc. that communicates a particular sentiment about a product or service contained within the data stream 210 or the sorted data 230. The keyword 232 can be used as a flag to one or more computer programs that the phrase or other content object is to be analyzed for a formal determination of the expressed sentiment. For example, if the word "great" was present in a list, database, or other collection of specified keywords 232, the following phrases would be flagged: "This product is great!," "There is nothing great about this product!," "Great Scott! I just got a new product!". However, it is apparent from the examples above that context and other clues are needed to determine the sentiment beyond just identifying the presence of the keyword 232.

The opinion mining platform 240 can be a program, module, etc. that, when executed on a computer, identifies the presence of keywords 232 in the sorted data 230 for use in determining and scoring a sentiment present in the sorted data 230. In one implementation, the opinion mining platform 240 can encapsulate, in one or more computer programs, the determination of selected content 250 and using the sentiment extraction program 260 to determine a sentiment metric 270.

The selected content 250 can be generated by the opinion mining platform 240 selecting any amount of surrounding text, video, audio, webpage information, etc. that is needed in order to provide context for further analysis when determining the sentiment that is associated with the keyword 232. Using text as an example, the opinion mining platform 240 can extract the whole sentence, the whole paragraph, or the whole webpage, etc. to provide the needed context. Metadata can also be extracted to add context, e.g. what site the keyword 232 was found on, when it was posted, etc. Also, the selected content 250 can be refined by cleaning the data according to the acceptable parameters. Typically this cleaning involves getting rid of text that will not be used in any process further down the process. For example, text blocks such as punctuations, XML tags, hashtags etc are removed from the text. In this process, some of the words can also be slightly transformed, e.g. correcting minor spelling errors, or removing stop words etc.

The sentiment extraction program 260 determines the sentiment associated with the selected content 250. In one implementation, a sentiment present in the selected content 250 can be expressed as three distinct entities. First, there can be a subject entity, e.g. a product, service, company, or person about whom/which the sentiment is expressed. Second, there can be a feature of the subject entity, e.g. screen of a phone, styling of a car, voice of an actor, or length of a movie. Third, there can be a subjective opinion, i.e. a sentiment, about the feature of the subject. Typically, sentiment determination is carried out on textual content, however images, audio and video content can also be used for input if it is converted into appropriate textual representation e.g. description of image, transcript of audio, etc.

In one implementation, the sentiment extraction program 260 can use natural language processing (NLP), or any other form of artificial intelligence, machine learning, etc. programs to determine the sentiment. Sentiment analysis techniques can be classified as, for example, machine learning based, lexicon-based, hybrid-based (machine learning+lexicon), or collection-based.

Machine learning based approaches can use different machine learning algorithms to solve the sentiment analysis as a regular text classification problem that makes use of syntactic and/or linguistic features. In this method, supervised, unsupervised and semi-supervised machine learning techniques can be used. The supervised methods can make use of a large number of labeled training documents. The unsupervised methods can be used when it is difficult to find these labeled training documents. The semi-supervised methods can be used when there are enough training documents to provide guidance, but not enough to qualify for the supervised methods.

The lexicon-based approach can rely on a sentiment lexicon, a collection of known and precompiled sentiment terms. It can be divided into dictionary-based approach and collection-based approach which use statistical or semantic methods to find sentiment polarity. The dictionary-based approach depends on finding opinion seed words, and then can search the dictionary for their synonyms and antonyms.

The hybrid approach uses a combination of techniques both machine learning and lexicon-based approaches to improve the accuracy of the analysis.

The collection-based approach uses a seed-list of opinion words, and then finds other opinion words in a large corpus to help in finding opinion words with context specific orientations.

The above analysis can require the sentiment extraction program 260 to be trained to associate certain words, phrases, etc. with a given sentiment, resulting in a score for the expressed sentiment. In the above example, comparing "This product is great!" to "There is nothing great about this product!," the sentiment extraction program 260 can determine that the first statement is positive and assign a positive score to it, reflecting the positive sentiment. With the second phrase, the modifier "nothing" in front of "great" can cause a negative score to be assigned, illustrating the importance of context in determining a score. Similarly, the modifiers or other context can influence the score. For example "This product is not great." can be determined to be not as strongly negative as "There is nothing great about this product."

In one implementation, the score can be expressed as a sentiment metric 270, where the sentiment metric 270 can be descriptive e.g. "Positive", "Negative", or "Neutral". In another implementation, the sentiment metric 270 can be a numerical range, e.g. −1 to +1, 0 to 100, etc. The sentiment metric 270 can be stored in any number of program variables or other output, e.g. tables, arrays, lists, etc. and then transmitted to other programs that make use of the determined sentiment.

The rules extractor program 280 can be a decision making program or module that accepts as input the sentiment metric 270 for determining if a predetermined rule is satisfied. If the rule is satisfied, then instruction to perform an action can be issued based on the rule. There can be a number of desired actions that a user or business wants to occur in reaction to consumer sentiment. As mentioned above, if shortly after a product launch, a product is found to have a very negative sentiment score, then one action can be to initiate troubleshooting and/or recall actions. There can be any number of rules associated with sentiment scores. Some examples are provided below:

If the sentiment metric 270>0.5 then send a "thank you" email.

If −0.1<the sentiment metric 270<0.1 then do nothing.

If the sentiment metric 270=="negative" then send apology and offer a coupon.

If a certain new product launched by the company is found to be generating negative sentiment from multiple users soon after its launch, modify the prioritization system in the customer service system such that any calls regarding that particular product are moved to the front of the queue (i.e. are answered quickly).

If a competitor's product is getting negative mentions during some critical shopping period (Christmas/Valentine's Day, etc.) create a short-lived discount scheme for the company's own product that could benefit from the current negative opinion about the competitor.

If the analysis reveals strong positive correlation with a new feature of recently released product, the marketing department could ensure that this particular feature gets more coverage in advertising.

In another implementation, there can be other conditionals to satisfy, such as the number, frequency, or intensity of a given sentiment. For example, if the sentiments are strongly positive, but of low frequency, then no action is taken. However, if the sentiments are strongly positive and of high frequency, then the rules extractor 280 can determine that a coupon or other advertisement is to be generated to target a competitor's product, taking advantage of the surge of positive sentiment for the current product.

In one implementation, determinations of whether or not a rule or rules are satisfied can be based on multiple sentiment metrics 270. For example, there can be a rule that is satisfied if a certain number of strongly positive sentiments are received, in addition to receiving less than a certain number of strongly negative sentiments.

In one implementation, if the rule is not satisfied, then the opinion mining platform 240 can continue to mine the sorted data 230.

In one implementation, if the rule is satisfied, then the opinion mining platform 240 can direct the business rules engine 290 to execute the action.

The business rules engine 290 can be a program that executes the action determined by the rules extractor program 280. The business rules engine 290 can issue e.g. coupons, rebates, apologies, offers, sales, customer contact, etc. In one implementation this can be completely automated. In another implementation, there can be a degree of human action/oversight. For example, if rebates are to be mailed out in response to a determination by the rules extractor program 280 that the sentiment metric 270 is sufficiently negative, then an account manager can first have to personally contact the generator of the negative sentiment. The account manager can determine if the sentiment is genuine, and also get other feedback regarding the sentiment. In another implementation, the sentiment can also be communicated with the action, e.g. including the complaint or praise into the file used by customer service, etc.

Figure 3:
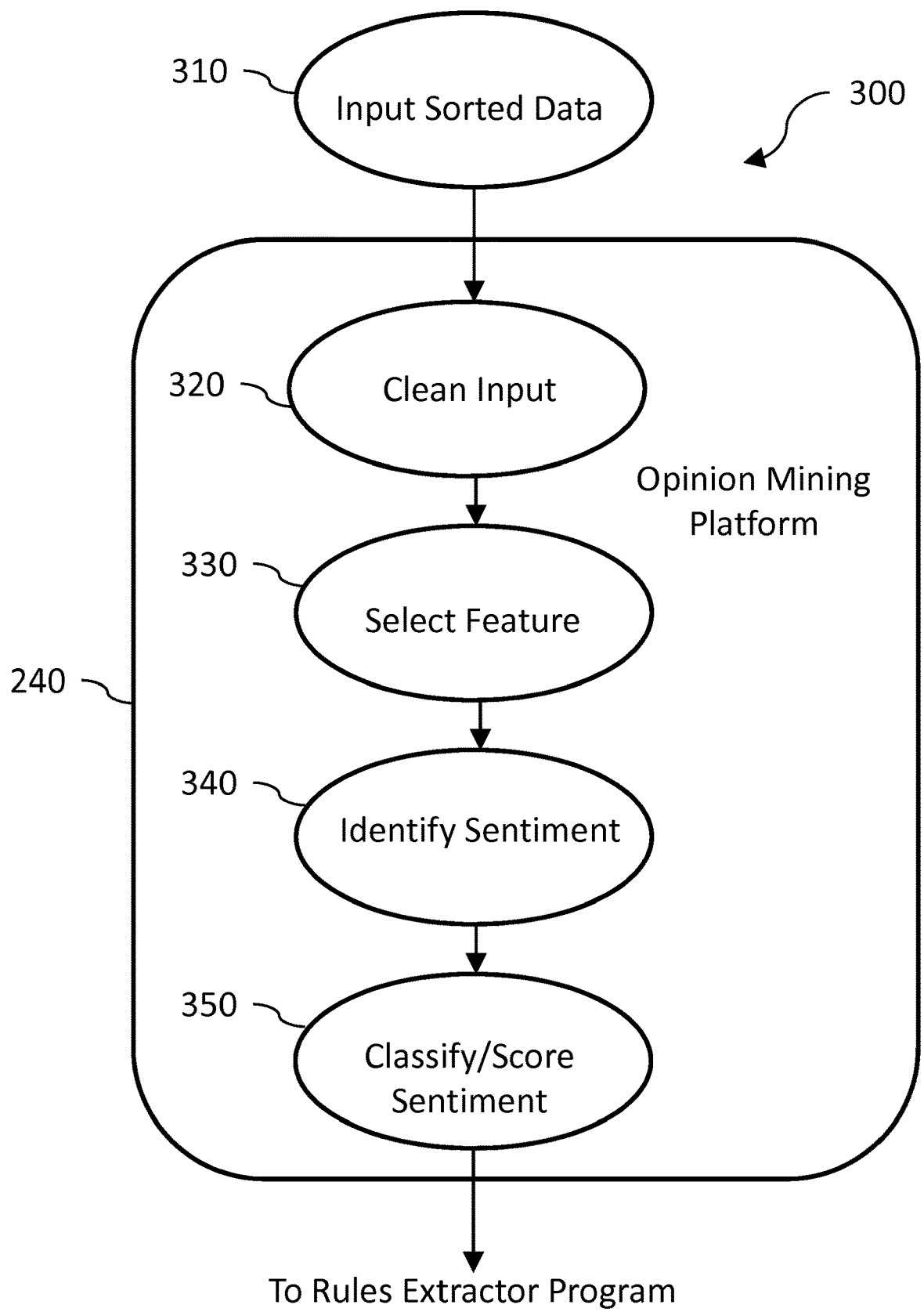
FIG. 3 is a process flow diagram illustrating an implementation of the opinion mining platform.

FIG. 3 is a process flow diagram 300 illustrating an implementation of the opinion mining platform. In 310 the sorted data 230 can be provided as input to the opinion mining platform 240, which contains the sentiment extraction program 260, as described above. In 320 the opinion mining platform 240 can perform generate the selected content 250, by cleaning input from the sorted data 230. In 330 features are selected from the selected content 250. In 340 sentiments are identified describing the features of the clean data. In 350, the sentiments are scored and/or classified to determine the sentiment metrics 270. The sentiment metrics can then be transmitted to the rules extractor program 280.

Figure 4:
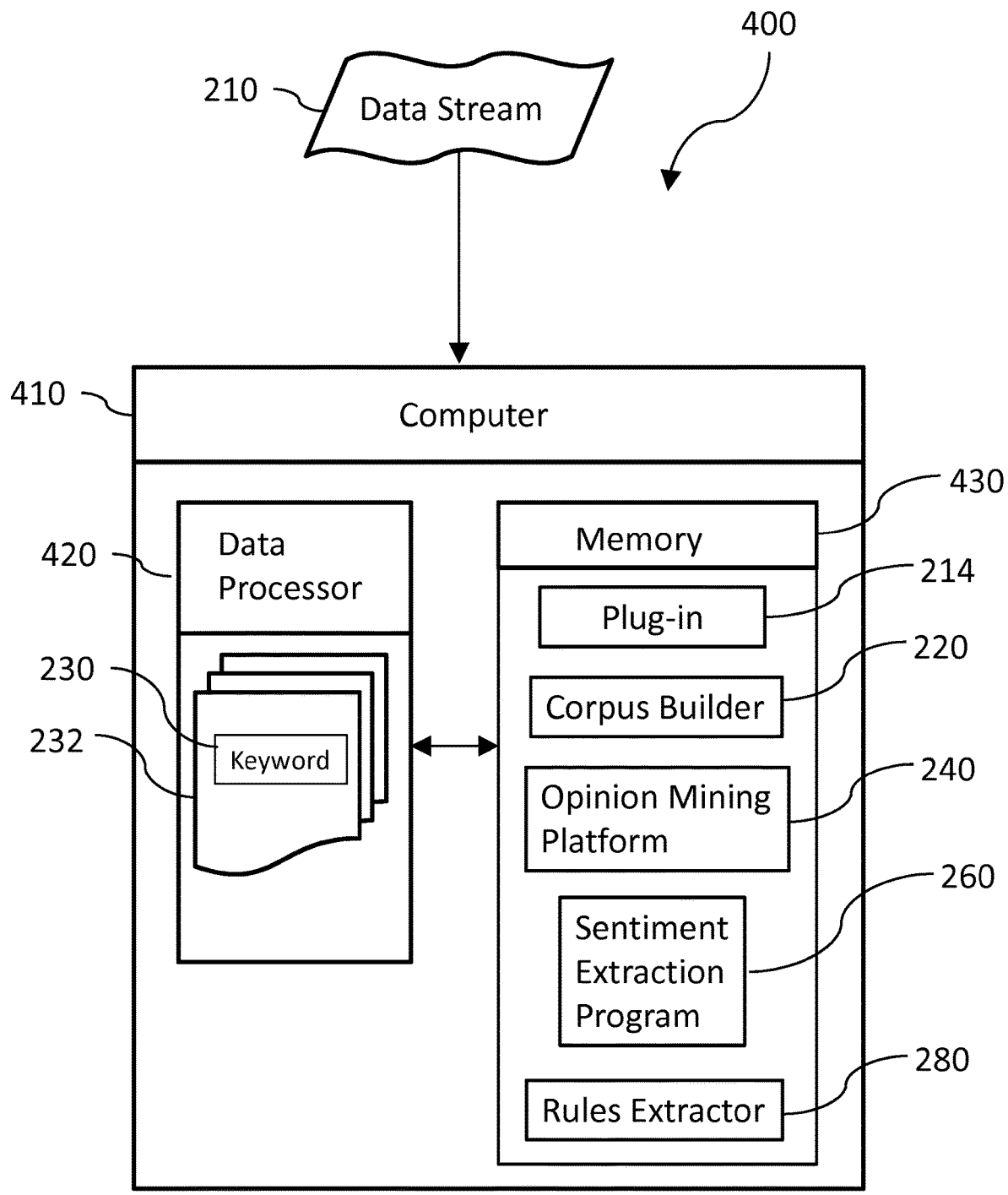
FIG. 4 is a diagram illustrating a system for performing sentiment analysis.

FIG. 4 is a diagram illustrating a system 400 for performing sentiment analysis. As shown in FIG. 4, the system shows a computer 410, having a data processor 420 and a memory 430, accepting the data stream 210 as input. The corpus builder 220, opinion mining platform 240, and the sentiment extraction program 260 can all be stored in the memory and accessed by the data processor to mine the sorted content from the data stream 210 for sentiments. In the implementation illustrated in FIG. 4, the business rules engine 290 is contained on another computer and not shown. In another implementation, the business rules engine 290 can be on the computer 310. In another implementation, the programs can be located across any number of computers and linked to work together.

Although the illustrative embodiments of the present disclosure have been described herein with reference to the accompanying drawings and examples, it is to be understood that the disclosure is not limited to those precise embodiments, and various other changes and modifications can be affected therein by one skilled in the art without departing from the scope of spirit of the disclosure. All such changes and modifications are intended to be included within the scope of the disclosure as defined by the appended claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A method comprising:

sorting, by at least one programmable processor executing a corpus builder, data from a data stream into a plurality of sorted data, the at least one programmable processor being a part of a first computer;

obtaining, by an opinion mining platform executed on at least one programmable processor, a plurality of selected content from the plurality of sorted data based on an identification of a plurality of keywords present in the plurality of sorted data, the plurality of keywords signifying a plurality of sentiments and embedded in the plurality of sorted data;

generating, by the opinion mining platform, selected content, the selected content comprising an amount of data from the data stream associated with and surrounding the plurality of keywords, the amount of data selected sufficient to provide context for further analysis when determining a sentiment that is associated with a keyword of the plurality of keywords, the selected content further comprising metadata associated with the keyword;

cleaning, by the opinion mining platform, the selected content, the cleaning comprising removing data that is not used in any further process;

generating, by a sentiment extraction program executed on the at least one programmable processor, a plurality of sentiment metrics based on an analysis of the plurality of selected content, the analysis being implemented using a hybrid natural language processing technique comprising a machine learning technique and a lexicon-based technique, the hybrid technique improving an accuracy of the analysis, the lexicon-based technique based on a collection of known and precompiled sentiment terms, the plurality of sentiment metrics comprising a score indicating an association of a word of the selected content with a sentiment;

determining, by the sentiment extraction program and based on the plurality of sentiment metrics, the sentiment associated with the selected content; and performing, by a rules extractor program executed on the at least one programmable processor and in response to the plurality of sentiment metrics satisfying at least one condition of a predetermined rule, an action based on the predetermined rule.

2. The method of claim 1, wherein the generating the plurality of sentiment metrics further comprises:

generating the selected content by cleaning input from the sorted data;

selecting features from the selected content;

identifying a sentiment of the plurality of sentiments, the sentiment describing the features of the clean data;

scoring and/or classifying the sentiment to determine the sentiment metrics; and transmitting the sentiment metrics to the rules extractor program.

3. The method of claim 1 wherein, based on the rules extractor program determining that the plurality of conditions are not satisfied, the opinion mining platform continues to obtain the plurality of selected content from the sorted data based on the identification of the plurality of keywords present in the plurality of sorted data.

4. The method of claim 1 wherein, based on the rules extractor program determining that the at least one condition is satisfied, the opinion mining platform continues to obtain the plurality of selected content from the sorted data based on the identification of the plurality of keywords present in the plurality of sorted data.

5. The method of claim 1, wherein the sentiment comprises a subject entity about whom/which the sentiment is expressed, a feature of the subject entity, and a subjective opinion about the feature of the subject.

6. The method of claim 1, wherein the plurality of sentiment metrics are numerical values.

7. The method of claim 1, wherein the plurality of sentiment metrics are descriptive values.

8. The method of claim 1, wherein the business rules engine is fully automated and does not require human intervention for execution of the action.

9. The method of claim 1, wherein the business rules engine is partially automated and requires human intervention for execution of the action.

10. The method of claim 1, wherein the selected content comprises text, video, audio, webpage information, and/or metadata.

11. The method of claim 1, wherein the plurality of actions is performed by the business rules engine.

12. A computer program product comprising a non-transitory machine-readable medium storing instructions that, when executed by at least one programmable processor, cause the at least one programmable processor of a first computer to perform operations comprising:

sorting, by a corpus builder, data from a data stream into a plurality of sorted data;

obtaining, by an opinion mining platform, a plurality of selected content from the plurality of sorted data based on an identification of a plurality of keywords present in the plurality of sorted data, the plurality of keywords signifying a plurality of sentiments and embedded in the plurality of sorted data;

generating, by the opinion mining platform, selected content, the selected content comprising an amount of data from the data stream associated with and surrounding the plurality of keywords, the amount of data selected sufficient to provide context for further analysis when determining a sentiment that is associated with a keyword of the plurality of keywords, the selected content further comprising metadata associated with the keyword;

cleaning, by the opinion mining platform, the selected content, the cleaning comprising removing data that is not used in any further process;

generating, by a sentiment extraction program, a plurality of sentiment metrics based on an analysis of the plurality of selected content, the analysis being implemented using a hybrid natural language processing technique comprising a machine learning technique and a lexicon-based technique, the hybrid technique improving an accuracy of the analysis, the lexicon-based technique based on a collection of known and precompiled sentiment terms, the plurality of sentiment metrics comprising a score indicating an association of a word of the selected content with a sentiment;

determining, by the sentiment extraction program and based on the plurality of sentiment metrics, the sentiment associated with the selected content; and performing, by a rules extractor program executed on the at least one programmable processor and in response to the plurality of sentiment metrics satisfying at least one condition of a predetermined rule, an action based on the predetermined rule.

13. The computer program product of claim 12, wherein the generating further comprises:

generating the selected content by cleaning input from the sorted data;

selecting features from the selected content;

identifying a sentiment of the plurality of sentiments, the sentiment describing the features of the clean data;

scoring and/or classifying the sentiment to determine the sentiment metric; and transmitting the sentiment metric to the rules extractor program.

14. The computer program product of claim 12, wherein the plurality of actions is performed by the business rules engine.

15. The computer program product of claim 12, wherein the plurality of actions is not performed by the business rules engine.

16. The computer program product of claim 12, wherein irrespective of the determining, the opinion mining platform continues to obtain the plurality of selected content from the sorted data based on the identification of the plurality of keywords present in the plurality of sorted data.

17. A system comprising:

at least one programmable processor of a first computer; and memory storing instructions, which when executed by the at least one programmable processor, result in operations comprising:

sorting, by at least one programmable processor executing a corpus builder, data from a data stream into a plurality of sorted data;

obtaining, by an opinion mining platform executed on at least one programmable processor, a plurality of selected content from the plurality of sorted data based on an identification of a plurality of keywords present in the plurality of sorted data, the plurality of keywords signifying a plurality of sentiments embedded in the plurality of sorted data, the plurality of selected content comprising an amount of data from the data stream associated with and surrounding the plurality of keywords, the amount of data selected sufficient to provide context for further analysis when determining a sentiment that is associated with a keyword of the plurality of keywords, the selected content further comprising metadata associated with the keyword;

cleaning, by the opinion mining platform, the selected content, the cleaning comprising removing data that is not used in any further process;

generating, by a sentiment extraction program executed on the at least one programmable processor, a plurality of sentiment metrics based on an analysis of the plurality of selected content, the analysis being implemented using a hybrid natural language processing technique comprising a machine learning technique and a lexicon-based technique, the hybrid technique improving an accuracy of the analysis, the lexicon-based technique based on a collection of known and precompiled sentiment terms, the plurality of sentiment metrics comprising a score indicating an association of a word of the selected content with a sentiment;

determining, by the sentiment extraction program and based on the plurality of sentiment metrics, the sentiment associated with the selected content; and performing, by a rules extractor program executed on the at least one programmable processor and in response to the plurality of sentiment metrics satisfying at least one condition of a predetermined rule, an action based on the predetermined rule.

18. The system of claim 17, further comprising generating the selected content by cleaning input from the sorted data.

19. The system of claim 17, further comprising selecting features from the selected content.

20. The system of claim 17, further comprising identifying a sentiment of the plurality of sentiments, the sentiment describing the features of the clean data.

21. The system of claim 17, further comprising scoring and/or classifying the sentiment to determine the sentiment metrics.

22. The system of claim 17, further comprising transmitting the sentiment metrics to the rules extractor program.

* * * * *